Aug. 28, 1923.
A. F. KNOOP
1,466,049
DRAWBAR FOR TOWING AUTOMOBILES AND THE LIKE
Filed June 17, 1922
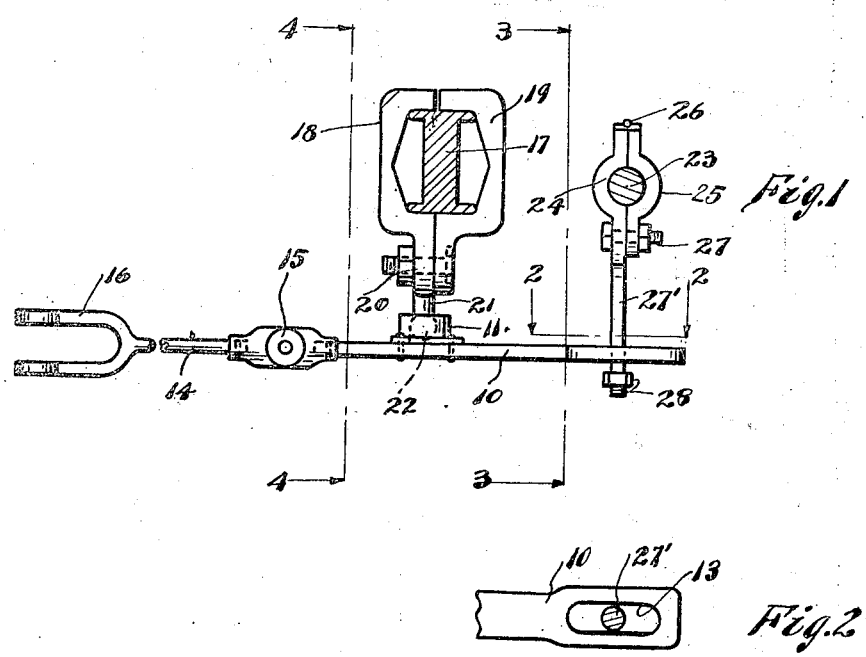
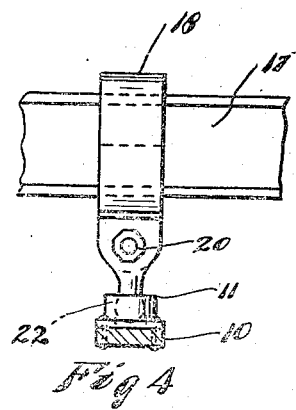
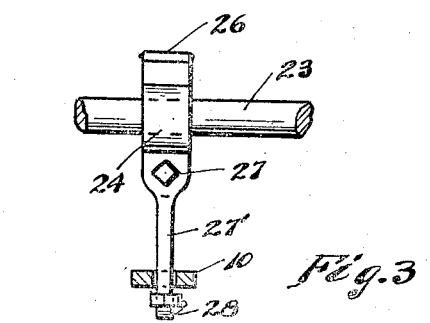
Witnesses:
Inventor:
Arnold F. Knoop
By Joshua R. H. Potts
His Attorney Patented Aug. 28, 1923.

1,466,049

UNITED STATES PATENT OFFICE.

ARNOLD F. KNOOP, OF PEOTONE, ILLINOIS.

DRAWBAR FOR TOWING AUTOMOBILES AND THE LIKE.

Application filed June 17, 1922. Serial No. 568,979.

*To all whom it may concern:*

Be it known that I, ARNOLD F. KNOOP, a citizen of the United States, and a resident of the city of Peotone, county of Will, and State of Illinois, have invented certain new and useful Improvements in Drawbars for Towing Automobiles and the like, of which the following is a specification.

This invention relates to draw bars for towing automobiles and the like, and has for its object the provision of a device of this character which will steer a trailing vehicle in such manner that the same will follow the direction of travel of the towing vehicle.

Other objects will appear hereinafter.

The invention consists in the combinations and arrangements of parts hereinafter described and claimed.

The invention will be best understood by reference to the accompanying drawings forming a part of this specification, and in which, Fig. 1 is a side elevation of the invention in operative position, showing in section parts of the vehicle to which same is adapted to be attached;

Fig. 2 is a view partly in section on the line 2—2 of Fig. 1;

Fig. 3 is a view partly in section on the line 3—3 of Fig. 1; and

Fig. 4 is a view partly in section on the line 4—4 of Fig. 1.

The invention provides a draw bar which may be pivotally and detachably connected to the front axle, and to the tie rod of the vehicle it is desired to tow, so that when the end of the draw bar connected to the towing vehicle is moved in a certain direction, such movement is transmitted to the tie rod of the trailing vehicle and thence to the wheels of such vehicle, so that the trailing vehicle follows the direction of movement of the towing vehicle.

The draw bar preferably consists of a flat bar 10, provided intermediate its ends with a suitable preferably detachable boss 11 having a ball socket therein. The rear end of the bar 10 is slotted as shown at 13, and the forward end of the bar is connected to an extension 14 by means of a suitable universal joint 15. The extension 14 may have a fork or yoke 16 adapted to be engaged with any suitable fastening means upon the towing vehicle (not shown).

The draw bar 10 is preferably connected to the front axle of the trailing vehicle by means of a detachable clamp, which clamp may consist of sections 18 and 19, adapted to be secured in the proper position on the axle 17 by a bolt 20. The section 18 is preferably provided with a reduced portion 21, at the lower end of which is a ball 22, which may be detachably held in the socket provided in the boss 11, whereby the bar 10 is permitted to rock laterally and vertically.

The rear end of the draw bar 10 is connected to the tie rod 23 of the trailing vehicle by means of a clamp which preferably consists of sections 24 and 25, such sections preferably being hinged together at their outer ends as shown at 26, and adapted to be detachably secured in position on the tie rod by means of a bolt 27. The section 24 preferably is provided with an extension 27' which projects through the slot 13 in the draw bar 10, and a nut 28 may be threaded on such extension to hold the draw bar in engagement therewith.

By this arrangement when the extension 14 is connected to the towing vehicle the various changes in direction of the towing vehicle are communicated to the tie rod 23 by means of the pivotal movement of the draw bar 10, the ball and socket connection between the draw bar 10 and the axle 17 permitting both lateral and vertical rocking of the draw bar, and the slot in the rear end of the draw bar 10 allowing the requisite play between the extension 27' and the draw bar 10. The universal joint 15 also takes care of sudden movements of the towing vehicle and also vertical movements imparted to the extension 14 due to inequalities in the roadway, etc.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention, what I claim as new and desire to secure by Letters Patent is:

1. In combination, a draw bar of a continuous piece of material, said draw bar being adapted to be attached to a towing vehicle; means secured to the outer surface of said draw bar, said means providing a socket; means connected to the axle of a trailing vehicle, said means including a portion provided with a ball adapted to engage said socket; and means mounted on the tie rod of said trailing vehicle movably engaging the end of said draw bar, substantially as described.

2. In combination, a draw bar adapted to be attached to a towing vehicle, said draw bar having means thereon providing a socket; means connected to the axle of a trailing vehicle, said means including an extension provided with a ball adapted to engage said socket; means for movably securing said draw bar to the tie rod of said trailing vehicle; and a universal joint in said draw bar interposed between the fulcrum thereof and the towing vehicle, substantially as described.

3. In combination, a draw bar of a continuous piece of material, said draw bar being adapted to be attached to a towing vehicle; means secured to the outer surface of said draw bar, said means providing a socket; means connected to the axle of a trailing vehicle, said means including a portion provided with a ball adapted to engage said socket; means mounted on the tie rod of said trailing vehicle movably engaging the end of said draw bar; and a universal joint in said draw bar interposed between the fulcrum thereof and the towing vehicle, substantially as described.

In testimony whereof I have signed my name to this specification in the presence of two subscribing witnesses.

ARNOLD F. KNOOP.

Witnesses:
JOSHUA R. H. POTTS,
FRANK J. HINRICKS.